United States Patent [19]

Boehrer

[11] Patent Number: 5,235,149
[45] Date of Patent: Aug. 10, 1993

[54] CONTAINER FOR A PRODUCT TO BE HEATED IN A MICROWAVE OVEN

[75] Inventor: Marianne Boehrer, Selestat, France

[73] Assignee: Societe Alsacienne d'Aluminium, Saint-Julien-en-Genevois, France

[21] Appl. No.: 960,284

[22] Filed: Oct. 13, 1992

Related U.S. Application Data

[63] Continuation of Ser. No. 675,633, Mar. 27, 1991, abandoned.

[30] Foreign Application Priority Data

Mar. 28, 1990 [FR] France .................. 90 03958

[51] Int. Cl.⁵ ............................. H05B 6/80
[52] U.S. Cl. .................... 219/10.55 E; 219/10.55 F; 426/113; 426/234; 426/243; 220/359
[58] Field of Search ............. 219/10.55 E, 10.55 F; 426/107, 113, 115, 118, 234, 243, 126, 127; 220/359, 367

[56] References Cited

U.S. PATENT DOCUMENTS

| | | | |
|---|---|---|---|
| 3,391,847 | 7/1968 | Christine et al. | 220/359 |
| 3,997,677 | 12/1976 | Hirsch et al. | 426/113 |
| 4,055,672 | 10/1977 | Hirsch et al. | 426/127 |
| 4,058,632 | 11/1977 | Evans et al. | 426/126 |
| 4,209,126 | 6/1980 | Elias | 220/359 |
| 4,438,850 | 3/1984 | Kahn | 426/107 |
| 4,605,142 | 8/1986 | Itoh et al. | 220/359 |
| 4,797,523 | 1/1989 | Kohneu | 219/10.55 E |
| 4,848,931 | 7/1989 | Kamada et al. | 219/10.55 E |
| 4,876,427 | 10/1989 | Mode | 219/10.55 E |
| 5,002,189 | 3/1991 | Sahi | 426/112 |
| 5,012,061 | 4/1991 | Lesser | 219/10.55 E |
| 5,012,946 | 5/1991 | McCarthy | 220/359 |
| 5,039,001 | 8/1991 | Kinigakis et al. | 426/118 |

Primary Examiner—Bruce A. Reynolds
Assistant Examiner—Tuan Vinh To
Attorney, Agent, or Firm—Finnegan, Henderson, Farabow, Garrett & Dunner

[57] ABSTRACT

A container for a product to be heated or cooked in an oven such as a microwave oven, whose lid comprises an upper sub-assembly (I) with a metal layer and a lower sub-assembly (II) comprising an upper heat reactivatable layer (4) affixed initially so as not to adhere against the metal layer (3) and a lower heat sealing layer (5) sealed against the peripheral flange (1). The heat reactivatable layer (4) and the heat sealing layer (5) are layers of a synthetic material which can be peeled respectively off the metal layer (3) and the peripheral flange (1). In addition the heat reactivatable layer (4) has, vertically in line with the peripheral flange (1) a peripheral portion (6) adhering to the metal layer (3) following heating thereof during sealing of the heat sealing layer (5) on the peripheral flange (1).

20 Claims, 3 Drawing Sheets

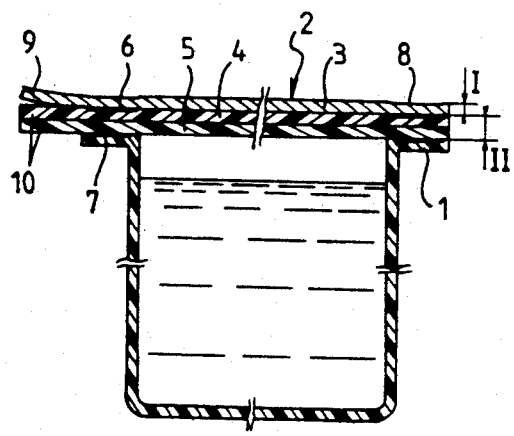
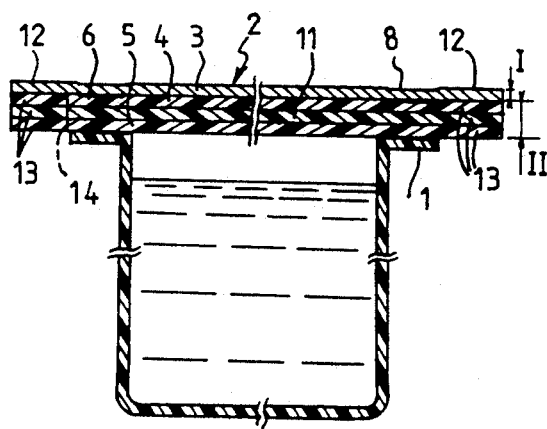
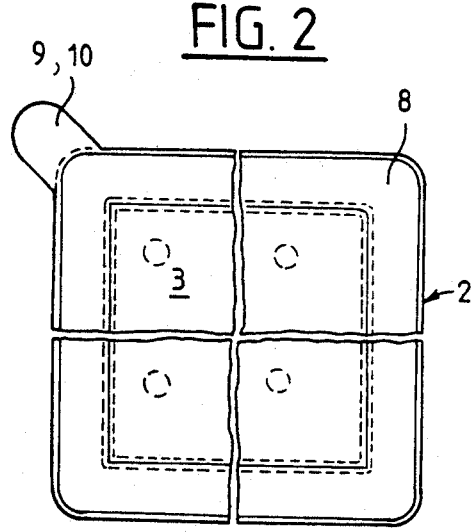
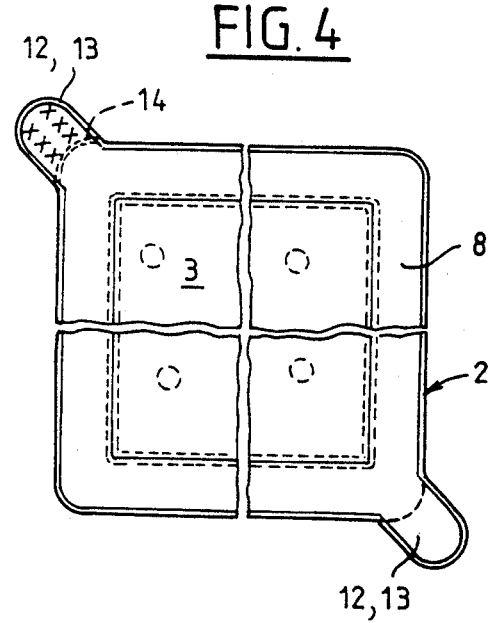

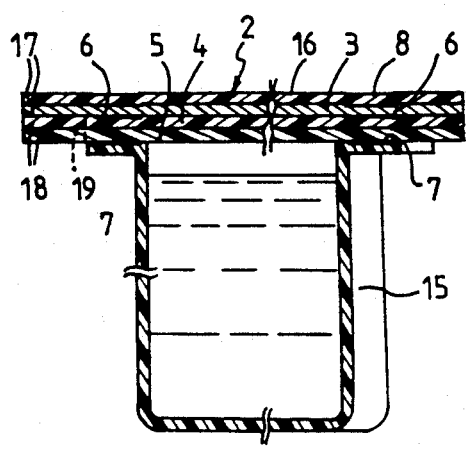
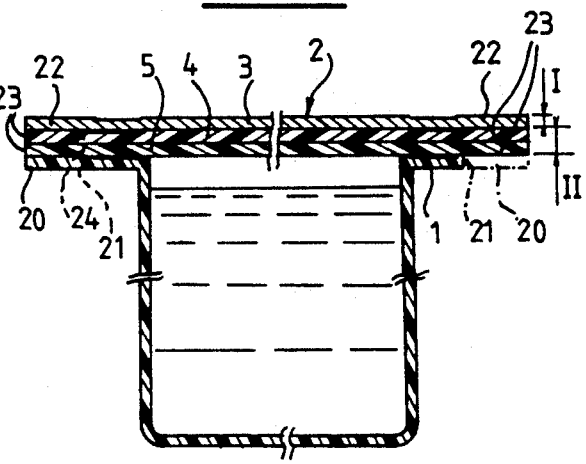
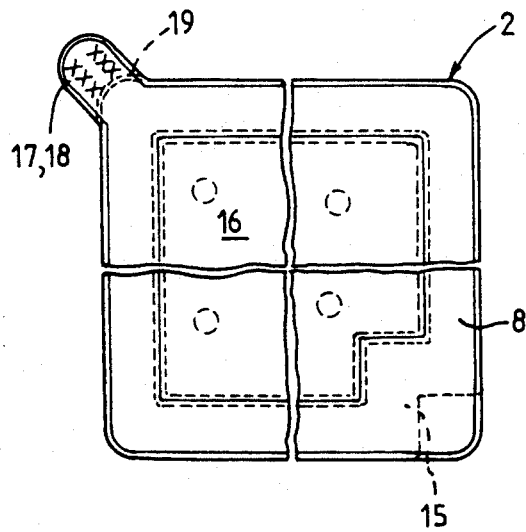
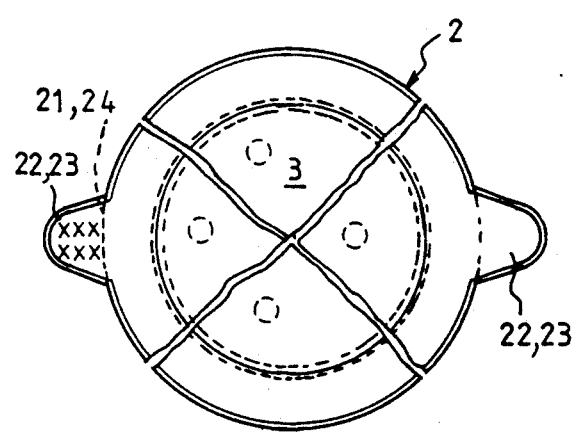

CONTAINER FOR A PRODUCT TO BE HEATED IN A MICROWAVE OVEN

This application is a continuation of application Ser. No. 07/675,633 filed Mar. 27, 1991, now abandoned.

The present invention relates to a container for products to be heated or cooked in an oven such as a microwave oven, comprising a peripheral flange on which a lid is fixed by heat sealing.

The lids of containers containing food or medical products in general comprise a metal layer for making them perfectly impermeable. However, this metal layer opposes the passage of waves in a microwave oven and, promoting the formation of an electric arc, prohibits the introduction of such containers in this type of oven for heating or cooking their contents.

The present invention proposes bringing a solution to this problem and, for this, it provides a container which is characterized in that its lid comprises an upper sub-assembly with a metal layer and a lower sub-assembly comprising an upper heat reactivatable layer affixed initially so as not to adhere against the metal layer and a lower heat sealing layer sealed against the peripheral flange, in that the heat reactivatable layer and the heat sealing layer are layers of a synthetic material which can be peeled respectively off the metal layer and the peripheral flange and in that the heat reactivatable layer has, vertically in line with the peripheral flange, a peripheral portion adhering to the metal layer following heating thereof during sealing of the heat sealing layer on the peripheral flange.

The upper sub-assembly of this lid may be readily separated from the heat reactivatable layer. It is then sufficient to remove it to be able to remove the metal layer and introduce the containers containing the products to be heated or cooked in a microwave oven without any problem.

Advantageously, the heat reactivatable layer has with respect to the metal layer an adhesive strength less than that of the heat sealing layer with respect to the peripheral flange.

The risks of the heat sealing layer being accidentally separated from the peripheral flange of the container during removal of the upper sub-assembly are thus avoided.

The thickness of the lid is preferably chosen as a function of the dimensions of the container. For example, for a container of the size of a yoghourt pot, the heat reactivatable layer and the heat sealing layer may be applied inseparably one against the other. On the other hand, for a container whose dimensions are appreciably larger, the heat reactivatable layer and the heat sealing layer may be situated on each side of at least one intermediate layer from which they are inseparable.

In a particular embodiment of the invention, the upper and lower sub-assemblies each comprise an opening tongue extending beyond the peripheral flange, the two tongues being superimposed but not adhering to each other.

It then suffices to exert a pull, first of all on the upper tongue to remove the upper sub-assembly just before introducing the container into a microwave oven, then on the lower tongue to remove the lower sub-assembly and open the container after heating or cooking.

In another embodiment, the upper and lower subassemblies each comprise two opening tongues each having a root substantially at the level of the free edge of the peripheral flange, the tongues of the upper sub-assembly adhering to the tongues of the lower sub-assembly whereas one of the latter is weakened at its root.

In this case it is recommended to affix, on the upper face of the lid, on the tongue of the upper sub-assembly which covers the weakened tongue, an indication informing the user to exert first of all a tractive force on these two tongues, so as to remove the metal layer before placing the container in a microwave oven. Under the action of this force, the weakened tongue will readily be separated from the lower sub-assembly but will remain fast with the tongue of the upper sub-assembly which covers it during removal of the latter.

The user will have to exert secondly a tractive force on the remaining tongue to remove the lower subassembly and open the container after heating or cooking.

When the container comprises a lateral indentation, it is desirable for the upper and lower sub-assemblies to project above the lateral indentation and each comprise an opening tongue having a root substantially at the level of the free edge of the peripheral flange, the two tongues being remote from the lateral indentation and adhering together, the tongue of the lower sub-assembly being further weakened at its root.

It is again advisable here to affix, on the upper face of the lid, on the tongues, an indication informing the user to exert first of all a tractive force on the tongues to remove the upper sub-assembly before introducing the container into a microwave oven.

Since the part of the lower sub-assembly which overhangs the lateral indentation forms a sort of tongue, the user will secondly instinctively exert a tractive force on this part to open the container after heating or cooking.

When the peripheral flange of the container has an external projection defined by a weakened line, it is desirable for the upper and lower sub-assemblies to each have two opening tongues each having a root substantially at the level of the free edge of the peripheral flange, for the opening tongues of the upper sub-assembly to adhere to the tongues of the lower sub-assembly, for the external projection to be covered by two of the tongues adhering to each other and for the tongue of the lower sub-assembly resting on the external projection to be weakened at its root.

It is here again recommended to affix on the upper face of the lid, on the tongue of the upper sub-assembly which overhangs the external projection, an indication informing the user to first of all break this external projection and exert a tractive force on the corresponding tongues to remove the upper sub-assembly.

In the second place, the user will instinctively exert a tractive force on the remaining tongue to open the container after heating or cooking.

When the peripheral flange has two external projections each defined by a weakened line, it is desirable for the upper and lower sub-assemblies to each have two opening tongues each with a root substantially at the level of the free edge of the peripheral flange, for the tongues of the lower sub-assembly to cover the external projections and adhere to the tongues of the upper sub-assembly and for one of the tongues of the lower sub-assembly to be weakened at its root.

It is still advisable to state on the lid the position from which the user must remove the upper subassembly before introducing the container into a microwave oven.

To the extent that the container has large dimensions, the metal layer may advantageously be coated on the outside with at least one reinforcement layer, this layer making the lid rigid and more resistant, particularly so that it may withstand a sterilisation operation.

Other characteristics and advantages of the present invention will be clear from the description of several embodiments, which will be given hereafter by way of non limitative examples, with reference to the accompanying drawings in which:

FIG. 1 is a schematic sectional view of a container according to a first embodiment;

FIG. 2 is a top view of the container shown in FIG. 1;

FIG. 3 is a schematic sectional view of a container according to a second embodiment;

FIG. 4 is a top view of the container shown in FIG. 3;

FIG. 5 is a schematic sectional view of a container according to a third embodiment;

FIG. 6 is a top view of the container shown in FIG. 5;

FIG. 7 is a schematic sectional view of a container according to a fourth embodiment, the flange of this container possibly comprising a second external projection, which is shown with a dash-dot line;

FIG. 8 is a top view of the container shown in FIG. 7;

Figure 9:
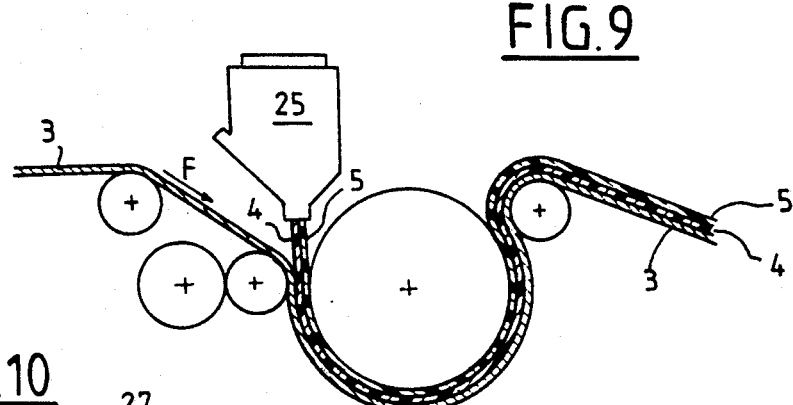
FIG. 9 is a diagram illustrating a method of manufacturing a laminated strip material from which the lids shown in FIGS. 1 and 7 may be obtained.

The containers according to the invention have been designed to receive long-life products, for example food products, intended to be heated or cooked in a microwave oven. These containers comprise, as is known a body having a cavity for holding the product and having a top entrance a peripheral flange 1 surrounding the entrance of their cavity and are sealingly closed by a lid 2 heat sealed to their peripheral flange. They are in general made from a synthetic material but they could possibly be made from metal provided that the upper face of the peripheral flange 1 is coated with a synthetic material film allowing their lid 2 to be heat sealed.

Generally, the lid of the containers according to the invention comprises an upper sub-assembly I with a metal layer 3 and a lower sub-assembly 11 with an upper heat reactivatable layer applied against the metal layer 3 and a lower heat sealing layer 5 sealed against the peripheral flange 1.

The heat reactivatable layer 4 and the heat sealing layer 5 are made from a synthetic material and may be separated, by peeling, respectively from the metal layer 3 and from the peripheral flange 1.

Furthermore, the heat reactivatable layer 4 has, vertically in line with the peripheral flange 1, a peripheral portion 6 which is reactivated, i.e. adhering to the metal layer 3, following heating thereof during sealing of the heat sealing layer 5 to the peripheral flange.

Lid 2 is fixed to the peripheral flange of a container by applying a conventional heat sealing tool on the portion of the lid which overhangs said peripheral flange.

Under the effect of the heat which it releases during its operation, this tool activates portion 6 of the heat reactivatable layer 4 which extends thereunder and thus allows this portion to adhere to the metal layer 4 while forming a sealed connection. It further allows the heat sealing layer 5 to be fixed sealingly on flange 1 by causing melting of portion 7 situated between these two elements.

It will in any case be noted that the heat sealing tool causes a slight deformation of the portion of the lid which overhangs flange 1 and causes a slightly hollow annular impression 8.

It will be further noted that when a lid 2 is sealed on a container, the heat reactivatable layer 4 has, with respect to the metal layer 3, a lower adhesive power than that of the heat sealing layer 5 with respect to flange 1.

In the embodiment shown in FIGS. 1 and 2, the heat reactivatable layer 4 and the heat sealing layer 5 are applied against each other inseparably.

Furthermore, the upper I and lower II sub-assemblies comprise opening tongues 9, 10 extending beyond flange 1, these tongues being superimposed but not adhering to each other since they are situated outside the annular impression 8 of the heat sealing tool.

Before introducing the container into a microwave oven, the user may readily separate the metal layer 3 from the rest of the lid by exerting a pull on tongue 9.

In the embodiment shown in FIGS. 3 and 4, the heat reactivatable layer 4 and the heat sealing layer 5 of the lower sub-assembly II are situated on either side of an intermediate layer 11 to which they are fast.

Furthermore, the upper I and lower II sub-assemblies each comprise two opening tongues 12, 13, spaced apart from each other and each having a root substantially at the level of the free edge of the flange 1 of the container.

In this embodiment, tongues 12 and 13 are adhered together during application of the heat sealing tool, one of tongues 13 being further weakened along a line 14 adjacent its root. Moreover, as is shown in FIG. 4, tongue 12 which is situated above the weakened tongue 13 carries an indication stating that the user will have to remove these tongues before introducing the container into a microwave oven.

When the user exerts a tractive force on these tongues, the weakened tongue 13 will be readily separated from the lower sub-assembly II along the weakened line 14, but will remain fast with the upper sub-assembly I which may thus be separated from the rest of the lid.

In the embodiment shown in FIGS. 5 and 6, the container comprises a lateral indentation 15 at one of its corners, the width of its peripheral flange being the same at the level of its lateral indentation as in its other portions.

Furthermore, the upper sub-assembly I of lid 2 comprises an additional reinforcement layer 16 fixed to the upper face of the metal layer 3.

In this embodiment, the upper I and lower II sub-assemblies project above the lateral indentation 15 so that the existence of the latter cannot be discerned when the lid is seen from the top. They comprise two tongues 17, 18 distant from the lateral indentation 15 and adhering together, tongue 18 of the lower sub-assembly II being weakened along a line 19 adjacent its root which is substantially at the level of the free edge of flange 1 of the container.

In addition, tongue 17 carries an indication telling the user that he must exert a tractive force on the pair of tongues 17, 18 to remove the upper sub-assembly I.

It will be noted here that the lid forms a sort of tongue outside the lateral indentation 15 and which the user may use to open the container, after the contents thereof have been heated or cooked in a microwave oven.

In the embodiment shown in FIGS. 7 and 8, the peripheral flange 1 of the container has an external projection 20 defined by a weakened line 21.

Furthermore, the upper I and lower II sub-assemblies each comprise two opening tongues 22, 23, spaced apart from each other and each having a root substantially at the level of the free edge of the peripheral flange 1.

The tongues 22 are adhered to tongues 23 during heat sealing. Furthermore, the external projection 20 is covered by the two tongues 22, 23 adhering together, tongue 23 resting on the external projection being weakened along a line 24 adjacent its root.

An indication on tongue 22 situated at the level of projection 20 is further provided for informing the user that he must exert a tractive force on the assembly formed by the projection and the corresponding tongues 22, 23 before introducing the container into a microwave oven.

In a variant, the peripheral flange 1 of the container could have a second external projection 20 defined by a weakened line 21, as shown with a dash-dot line in FIG. 7.

In this case, the second pair of tongues 22, 23 would rest then on this second external projection.

The materials will now be mentioned which may be used for constructing the lid 2 of containers according to the invention, with the thicknesses of the layers forming these lids.

Thus, the metal layer 3 may be a layer of aluminium or aluminium alloy, its thickness being of the order of 10 to 200 microns ($10^{-5}$ to $2.10^{-4}$ m).

The heat reactivatable layer 4 may be formed by a material chosen from the group comprising a grafted polypropylene, a grafted high density polyethylene, a grafted linear low density polyethylene, a grafted ethylene- vinyl acetate copolymer, a grafted ethylene-butyl acrylate copolymer, or a grafted ethylene-methyl acrylate copolymer, the grafting element being an unsaturated monomer comprising at least one carboxylic acid group, such as acrylic acid or malic anhydride, its thickness being of the order of 10 to 200 microns ($10^{-5}$ to $2.10^{-4}$ m).

The heat sealing layer 5 may be formed by a material chosen from the group comprising a polyester varnish or an extrudable layer having a polypropylene, high density polyethylene or polyester basis, its thickness being of the order of 5 to 100 microns ($5.10^{-6}$ to $10^{-4}$ m).

The intermediate layer 11 is formed by a material having an affinity with the heat reactivatable layer and with the heat sealing layer, its thickness being of the order of 10 to 200 microns ($10^{-5}$ to $2.10^{-4}$ m).

As for the reinforcement layer 16, it may be formed by a material chosen from the group comprising polyester or a polypropylene and its thickness being of the order of 10 to 200 microns ($10^{-5}$ to $2.10^{-4}$ m).

It will be further noted that the lower sub-assembly II of lids 2 could comprise perforations avoiding the formation of an overpressure in the containers during heating or cooking by microwaves of the products contained therein.

FIG. 9 illustrates a method of manufacturing a laminated strip from which the lids for closing the containers shown in FIGS. 1 to 7 may be cut out.

It shows that this laminated material may be obtained in a way known per se by coextruding a heat reactivatable layer 4 and a heat sealing layer 5 on a metal strip 3 moving in the direction of arrow F, the coextrusion taking place continuously through a die 25.

Figure 10:
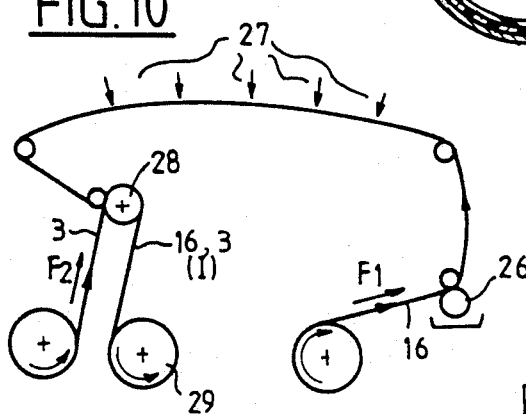
FIGS. 10 to 12 are diagrams illustrating three steps of a method for manufacturing a laminated strip material from which other lids may be obtained.
Figure 11:
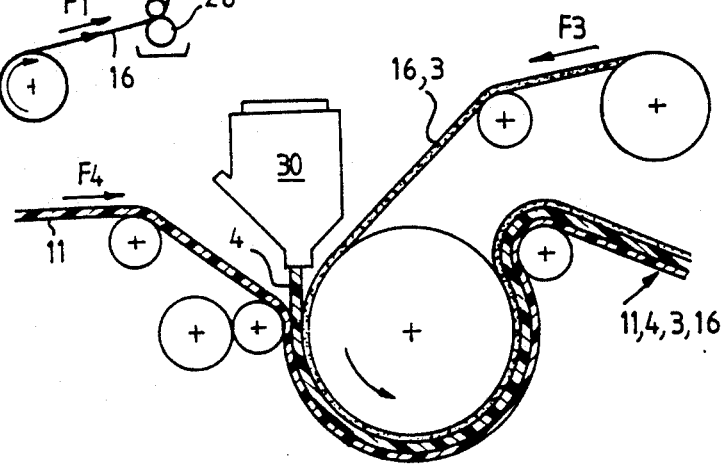
Figure 12:
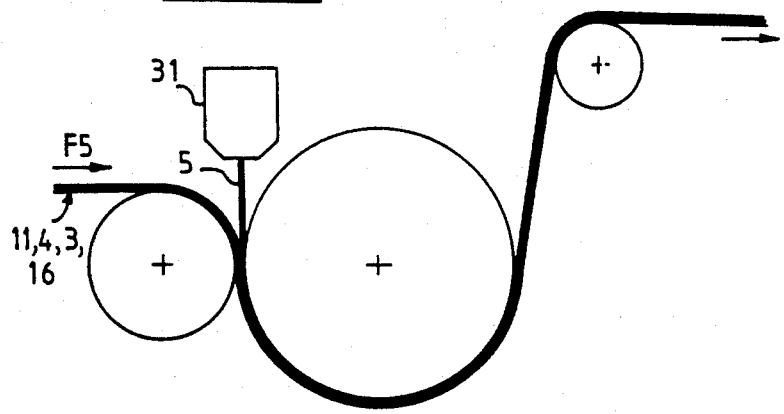

FIGS. 10 to 12 illustrate a method of manufacturing a laminated material strip from which lids may be cut out whose upper sub-assembly I comprises a metal layer 3 and a reinforcement layer 16 and whose lower sub-assembly II comprises an intermediate layer 11 between a heat reactivatable layer 4 and a heat sealing layer 5.

More precisely, FIG. 10 illustrates the first step of the manufacturing method, during which an elementary laminated strip material corresponding to the upper subassembly I is obtained:

- by applying, in a coating station 26, a film of adhesive on a reinforcement foil 16 driven continuously in the direction of arrow F1;
- by drying, in a drying station 27, the adhesive deposited on the reinforcement foil 16;
- by applying against the coated face of foil 16 in a joining station 28, a metal foil 3 driven in the direction of arrow F2 in synchronism with said foil 16; and
- by winding the resultant elementary laminate in the form of a reel 29.

FIG. 11 illustrates a second step of the manufacturing method, during which a second elementary strip laminate is obtained by extruding material forming the heat reactivatable layer 4 between the elementary laminate obtained in the first step and an intermediate layer 16, the material 4 forming the heat reactivatable layer being extruded from a die 30 while the first elementary laminate and layer 16 are driven in synchronism respectively in the direction of arrows F3 and F4.

FIG. 12 illustrates the third step of the manufacturing method, during which the final strip laminate is obtained by extruding a material forming the heat reactivatable layer 5 on the second elementary laminate obtained in the second step, the material forming layer 5 being extruded from a die 31 while the second elementary laminate moves in the direction of arrow F5.

I claim:

1. A container for a product to be heated or cooked in an oven comprising a container body having a cavity for holding the product and having a top entrance, a peripheral flange surrounding the entrance to the cavity and a lid for sealing the entrance of the cavity in said lid comprising and upper metal layer having peripheral portions and an inseparable, lower subassembly comprising at least a heat sealing layer having peripheral portions located above and immediately adjacent to said flange and a heat reactivatable layer located on an opposite side of the heat sealing layer from said flange and immediately adjacent said upper metal layer, the peripheral portions of the heat sealing layer located above the peripheral flange of the container being adhered thereto while only the peripheral portions of the upper metal layer that are located above the flange are adhered to the heat reactivatable layer as a result of applying heat and pressure to the peripheral portions of the lid, the upper metal layer adhering to the heat reactivatable layer of the lower sub-assembly with a strength less than that between the heat sealing layer and the peripheral flange of the container body.

2. The container of claim 1, wherein the heat reactivatable layer and the heat sealing layer are inseparably secured to each another.

3. The container of claim 1, wherein the lower sub-assembly includes an intermediate layer inseparably secured between said heat reactivatable layer and the heat sealing layer.

4. The container of claim 1, wherein the intermediate layer is formed from a material having a sealing affinity with the heat reactivatable layer and with the heat sealing layer.

5. The container of claim 3, wherein the intermediate layer has a thickness of from 10 to 200 microns.

6. The container of claim 1, wherein the upper metal layer and the lower sub-assembly each have at least one opening tongue extending beyond the peripheral flange, the two tongues being superimposed upon but not adhering to each other.

7. The container of claim 1, wherein the upper metal layer and the lower sub-assembly each have two opening tongues extending beyond the peripheral flange, each tongue having a root substantially coincidential with a free edge of the peripheral flange, the tongues of the upper metal layer adhering to the tongues of the lower sub-assembly, with one of the tongues of the lower sub-assembly being weakened at its root.

8. The container of claim 1, including a lateral indentation in the cavity of the container, the upper metal layer and the lower sub-assembly of the lid projecting out over said indentation and each having an opening tongue having a root substantially coincidential with a free edge of the peripheral flange, the two tongues being remote from said lateral indentation and adhering together, the tongue of the lower sub-assembly being weakened at its root.

9. The container of claim 1, wherein the peripheral flange has an external projection connected to said flange by a breakable connection, the upper metal layer and the lower sub-assembly each have two opening tongues with each tongue having a root substantially coincidential with a free edge of the peripheral flange, the tongues of the upper metal layer adhering to the tongues of the lower sub-assembly, one set of tongues covering the external projection of the flange with the tongue of the lower sub-assembly of said one set being weakened at its root.

10. The container of claim 1, wherein the peripheral flange has two external projections each connected to said flange by a breakable connection, the upper metal layer and the lower sub-assembly each having two opening tongues with each tongue having a root substantially coincidential with a free edge of the peripheral flange, the tongues of the lower sub-assembly covering the external projections and adhering to the tongues of the upper metal layer assembly, with one of the tongues of the lower sub-assembly being weakened at its root.

11. The container of claim 1, wherein the upper metal layer is coated on its outer side with at least one reinforcement layer.

12. The container of claim 11, wherein the reinforcement layer is from a polyester or a polypropylene resin.

13. The container of claim 11 or 12, wherein the reinforcement layer has a thickness of from 10 to 200 microns.

14. The container of claim 1 or 11 wherein the upper metal layer is a foil of aluminum or an aluminum alloy.

15. The container of claim 1, wherein the heat reactivatable layer is formed from a material selected from the group consisting of a grafted polypropylene, a grafted high density polyethylene, a grafted linear low density polyethylene, a grafted ethylene-vinyl acetate copolymer, a grafted ethylene-butyl acrylate copolymer, and a grafted ethylene-methyl acrylate copolymer, the grafting element being an unsaturated monomer comprising at least one carboxylic acid group.

16. The container of claim 1, wherein the heat sealing layer is formed from a material selected from the group consisting of a polyester, a polypropylene and a high density polyethylene resin.

17. The container of claim 1 or 11, wherein the upper metal layer has a thickness of from 10 to 200 microns.

18. The container of claim 1, wherein the heat reactivatable layer has a thickness of from 10 to 80 microns.

19. The container of claim 1, wherein the heat sealing layer has a thickness of from 5 to 100 microns.

20. The container of claim 1, wherein the lower sub-assembly contains perforations.

* * * * *

UNITED STATES PATENT AND TRADEMARK OFFICE
CERTIFICATE OF CORRECTION

PATENT NO. : 5,235,149

DATED : August 10, 1993

INVENTOR(S) : Marianne Boehrer

It is certified that error appears in the above-indentified patent and that said Letters Patent is hereby corrected as shown below:

Claim 1, column 6, line 51, "cavity in said" should read --cavity in, said--.

Claim 4, column 7, line 8, "claim 1" should read --claim 3--.

Signed and Sealed this

Tenth Day of May, 1994

*Attest:*

BRUCE LEHMAN

*Attesting Officer*   Commissioner of Patents and Trademarks